United States Patent
Maruta et al.

(10) Patent No.: US 7,110,176 B2
(45) Date of Patent: Sep. 19, 2006

(54) REFLEX-TYPE SCREEN

(75) Inventors: Hajime Maruta, Niigata (JP); Takahiro Koyanagi, Niigata (JP); Masatoshi Niwa, Niigata (JP)

(73) Assignee: Arisawa Mfg. Co., Ltd., Joetsu (JP)

( * ) Notice: Subject to any disclaimer, the term of this patent is extended or adjusted under 35 U.S.C. 154(b) by 173 days.

(21) Appl. No.: 10/916,880

(22) Filed: Aug. 12, 2004

(65) Prior Publication Data

US 2005/0248843 A1    Nov. 10, 2005

(30) Foreign Application Priority Data

May 7, 2004   (JP) ............................ 2004-139017
Jun. 8, 2004  (JP) ............................ 2004-170496

(51) Int. Cl.
*G03B 21/56*   (2006.01)
*G03B 21/60*   (2006.01)

(52) U.S. Cl. .................. 359/459; 359/455; 359/443

(58) Field of Classification Search ............. 359/454, 359/455, 459, 443
See application file for complete search history.

(56) References Cited

U.S. PATENT DOCUMENTS

| | | | |
|---|---|---|---|
| 5,096,278 A * | 3/1992 | Yoshioka et al. | 359/459 |
| 6,443,579 B1 * | 9/2002 | Myers | 359/613 |
| 6,609,799 B1 * | 8/2003 | Myers | 359/613 |

FOREIGN PATENT DOCUMENTS

| | | |
|---|---|---|
| GB | 1329276 | 9/1973 |
| JP | 11-44805 | 2/1999 |
| JP | 2000-241888 | 9/2000 |
| JP | 2000-347297 | 12/2000 |
| JP | 2003-156799 | 5/2003 |

OTHER PUBLICATIONS

Patent Abstracts of Japan, Publication No. 2000-347297 dated Dec. 15, 2000, 2 pgs.
Patent Abstracts of Japan, Publication No. 2000-241888 dated Sep. 8, 2000, 2 pgs.
Patent Abstracts of Japan, Publication No. 2003-156799 dated Apr. 30, 2003, 1 pg.
Patent Abstracts of Japan, Publication No. 11-044805 dated Feb. 16, 1999, 2 pgs.
Patent Act 1977: Search Report under Section 17 issued for GB0503362.6 mailed on Mar. 29, 2005, 1 page.

* cited by examiner

*Primary Examiner*—W. B. Perkey
*Assistant Examiner*—Magda Cruz
(74) *Attorney, Agent, or Firm*—Osha Liang LLP

(57) ABSTRACT

A reflex-type screen for reflecting obliquely projected light from a projector to a front of the screen. The screen includes a light absorbing base material and a plurality of inclined planes disposed on the base material. The planes are arranged such that projected light do not enter non-projector side inclined planes, and the projector side and non-projector side planes alternate to form a saw-tooth shaped arrangement. A light reflecting white resin layer is disposed on the projector side planes to reflect light from the projector to the front of the screen. A transparent light diffusing layer including binding agent and diffusing agent is formed to cover the white resin layer and the base material, including all inclined planes. The non-projector side inclined planes absorbs incident light and the diffusing layer diffuses light reflected by the white resin layer.

25 Claims, 4 Drawing Sheets

REFLEX-TYPE SCREEN

This patent application claims priority from a Japanese Patent Application No. 2004-139017 filed on May 7, 2004, and Japanese Patent Application No. 2004-170496 filed on Jun. 8, 2004, the contents of which are incorporated herein by reference.

BACKGROUND OF THE INVENTION

1. Field of the Invention

The present invention relates to a reflex-type screen. More particularly, the invention relates to the reflex-type screen for reflecting light, which is projected obliquely from a projector, to a front of the reflex-type screen.

2. Description of the Related Art

Conventionally, as shown in FIG. 1, there is a demand to display an image to a viewer who is located in front of a screen by projecting an image light obliquely to a reflex-type screen at a short distance from the reflex-type screen. When a generally-used white mat screen is applied to such a usage mentioned above, almost of the image light projected from a short focal length projector 21 is reflected to an exterior of the viewer's location, so that it is impossible to provide a uniform and bright image toward the viewer who is in front of the reflex-type screen 22.

As a reflex-type screen to overcome the above drawbacks, hologram type reflex-type screens are disclosed, for example, in Japanese Patent Laid-Open No. 2000-347297 and Japanese Patent Laid-Open No. 2000-241888 and each of these hologram type reflex-type screens uses a hologram element at the reflecting surface to diffuse and diffract the projected image light toward the viewer.

However, the hologram element used in the reflex-type screen holographic screen includes chromatic dispersion. Therefore, when an image light having a particular wavelength range (e.g., the image light from a projector) is projected, the color shift around the screen can occur because of the chromatic dispersion of the hologram element.

Moreover, the hologram element is manufactured by a so-called light exposure method, and in this case, hologram information is recorded on a photosensitive resin by an exposure process. As long as the exposure method is used, it is difficult to increase the screen size because of a restriction on a manufacturing method. In addition, in order to obtain different view angle properties between the vertical direction and the horizontal direction, a multiple light exposure is needed, which makes the manufacturing process more complex.

Therefore, it is an object of the present invention to solve the above-mentioned drawbacks. More particularly, it is an object of the present invention to provide a reflex-type screen, which has both a high contrast property and a fine view angle property, of which luminance distribution is uniform, and which is easily manufactured as a big size screen.

SUMMARY OF THE INVENTION

To achieve such objects, according to the first aspect of the present invention, a reflex-type screen for reflecting a light projected obliquely from a projector to a front of the reflex-type screen, comprises a base material made of material which absorbs light, a white resin layer which is formed on the projector side inclined plane on the base material and reflects light and a transparent diffusing layer which includes transparent binder resin and diffusing agent, and is formed to cover the white resin layer, and the base material includes a projector side inclined plane that is provided at an angle so that light from the projection enters the projector side inclined plane and a non-projector side inclined plane that is provided at an angle so that the light from the projection does not enter the non-projector side inclined plane, and the projector side inclined plane and the non-projector side inclined plane are located alternatively, so that the base material is formed to be saw-toothed shape. The white resin layer reflects the light from the projector to the front of the reflex-type screen, and the non-projector side inclined plane absorbs almost of incident light, and the transparent diffusing layer diffuses light which is reflected by the white resin layer. Therefore, it is possible to display the image having both a high contrast and a wide view angle.

According to the second aspect of the present invention, a reflex-type screen for reflecting a light projected obliquely from a projector to a front of the reflex-type screen, comprises a base material made of material which absorbs light and a white resin layer which is formed on the projector side inclined plane on the base material and reflects light. The base material includes a projector side inclined plane that is provided at an angle so that light from the projection enters the projector side inclined plane and a non-projector side inclined plane that is provided at an angle so that the light from the projection does not enter the non-projector side inclined plane and provided adjacent to the projector side inclined plane, and the projector side inclined plane and the non-projector side inclined plane are located alternatively, so that the base material is formed to be saw-toothed shape. The projector side inclined plane forms a hollow that corresponds to an extent of the white resin layer, and a surface of the white resin layer is formed to be flat on the hollow and the flat surface of the white resin layer reflects the light from the projector to the front of the reflex-type screen, and the non-projector side inclined plane absorbs almost of incident light. Therefore, the flatness of the white resin layer is improved because of the hollow of the projector side inclined plane. Therefore, it is possible to display the image having both a high contrast and a high peak gain.

In addition, in the second aspect of the present invention, the hollow in which the white resin layer may be formed becomes gradually deeper along a direction from an outside edge of the extent of the white resin layer to an inside of the extent of the white resin layer. Therefore, the liquid white resin with high viscosity can be avoided from being raised at an edge part of the white resin layer by surface tension in the coating process of the white resin layer and consequently the finishing flatness can be increased.

In both of the first aspect and the second aspect of the present invention, the white resin layer provided on the projector side inclined plane may include reflecting filler which reflects light and binder resin. Therefore, the image light can be reflected toward the viewer more effectively.

In both of the first aspect and the second aspect of the present invention, the white resin layer may be treated with surface roughing thereon. Therefore, diffusion performance can be easily improved and a sufficient view angle can be obtained.

In both of the first aspect and the second aspect of the present invention, the non-projector side inclined plane may be treated with surface roughing thereon. Therefore, the contrast of the reflex-type screen can be further improved.

In both of the first aspect and the second aspect of the present invention, the base material may include filler which absorbs light. Therefore, the outside light can be further absorbed and consequently the contrast of the reflex-type screen can be further improved.

In the first aspect of the present invention the transparent diffusing layer further may cover the non-projector side inclined plane and diffuse light which is reflected by the non-projector side inclined plane. Therefore, a regular reflection of the outside light reflected by the non-projector side inclined plane can be reduced and consequently a glare can be reduced.

In both of the first aspect and the second aspect of the present invention, a reflex-type screen may further comprise a reflection increasing layer, of which reflectivity may be higher than the reflectivity of the base material, and of which light blocking effect may be higher than the light blocking effect of the white resin layer, and which may be formed between the base material and the white resin layer. Therefore, the light from the projector can be reflected effectively since the light transmitted through the white resin layer is reflected, and the brightness of the image can be increased.

In the second aspect of the present invention, the reflection increasing layer may be a metal layer, essentially made of aluminum. Therefore, the reflection increasing layer can be formed easily by using vapor deposition, sputtering and so forth, and the reflectivity of the screen can be increased effectively.

In the second aspect of the present invention, both the white resin layer and the reflection increasing layer may include filler which reflects light and binder, and a reflectivity of the filler included in the reflection increasing layer may be higher than the reflectivity of the filler included in the white resin layer. Therefore, the reflection increasing layer can be formed easily in a similar way as the white resin layer and the filler with high reflectivity reflects the light which is transmitted through the white resin layer effectively. Therefore, the reflectivity of the screen can be increased easily and effectively.

In the second aspect of the present invention, both the white resin layer and the reflection increasing layer may include filler which reflects light and binder, and a content of the filler included in the reflection increasing layer may be higher than the content of the filler included in the white resin layer. Therefore, it is possible to prepare materials for the reflection increasing layer easily only by increasing the content of the filler, and the reflection increasing layer can be formed easily in a similar way as the white resin layer.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
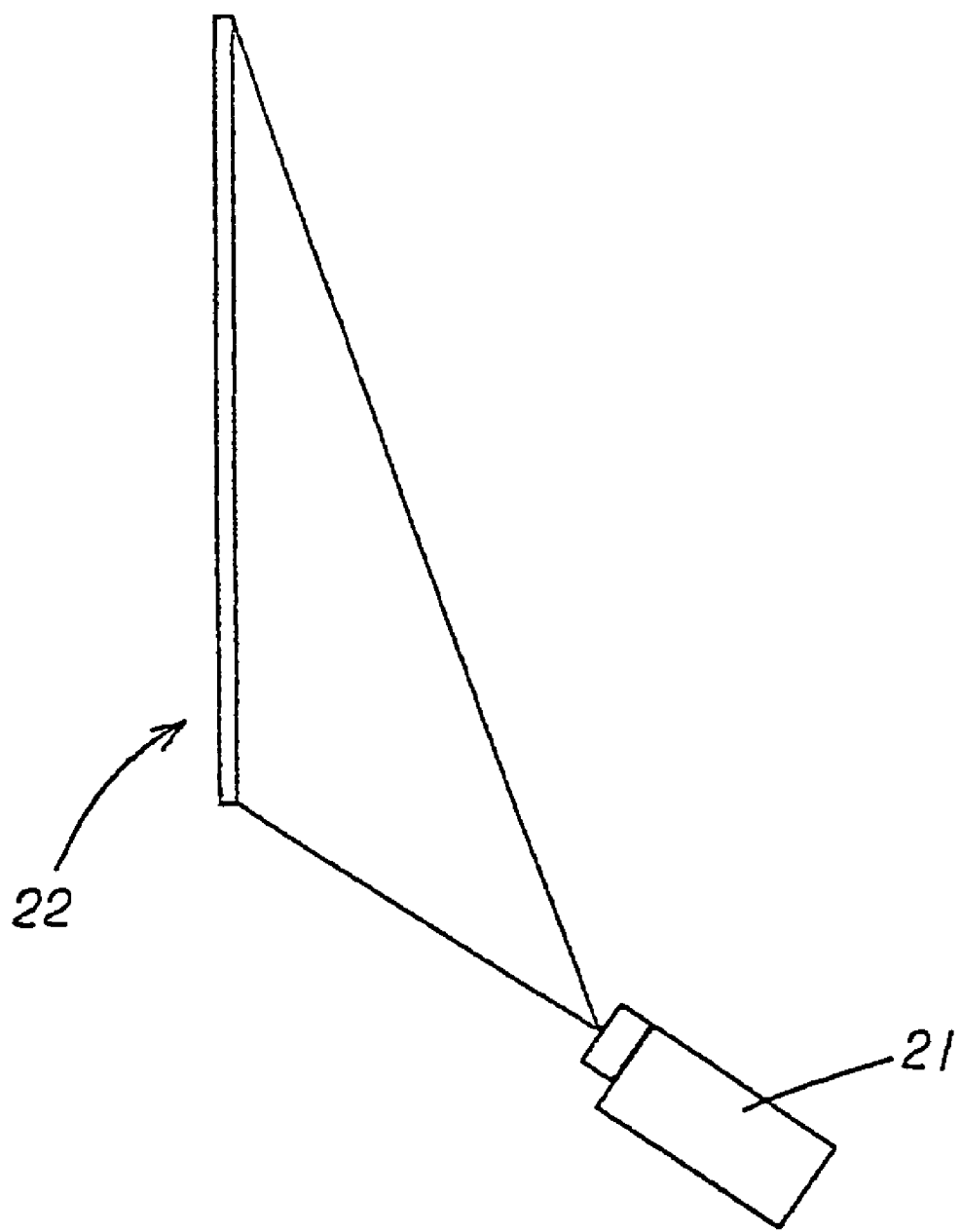
FIG. 1 is a drawing showing a conventional reflex-type short focal length projection 22 and a screen thereof.
Figure 2:
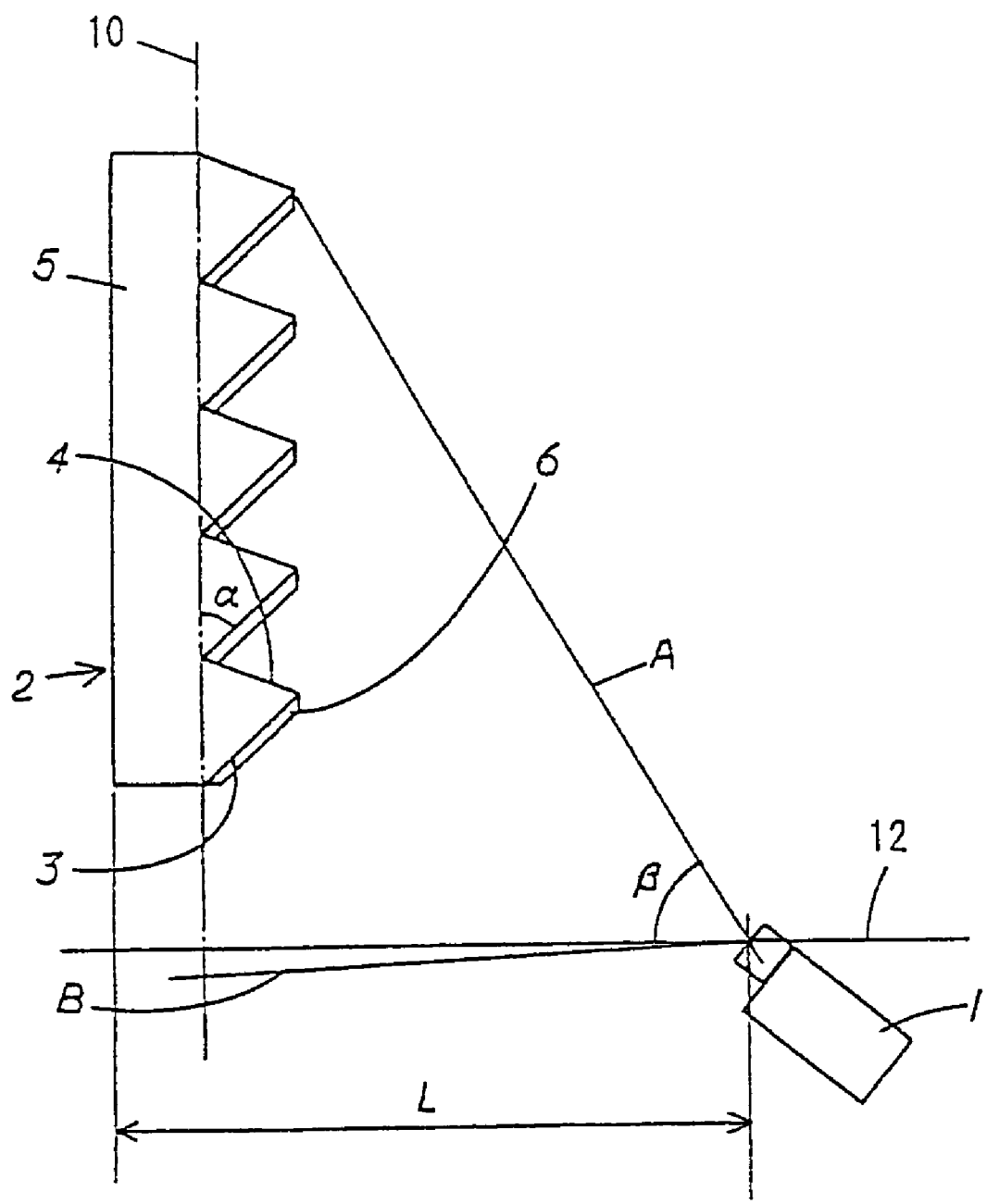
FIG. 2 is a drawing showing a basic configuration of a reflex-type screen 2 according to an embodiment of the present invention.

FIG. 2 shows a basic configuration of a reflex-type screen 2 according to an embodiment of the present invention. The reflex-type screen 2 includes a base material 5 having both a projector side inclined plane 3 and a non-projector side inclined plane 4, and a white resin layer 6. The base material 5 is made of light absorbing material. The projector side inclined plane 3 is provided at an angle so that the light from the projector 1 enters the projector side inclined plane 3, and the non-projector side inclined plane 4 is provided at an angle so that the light from the projector 1 does not enter the non-projector side inclined plane 4. The projector side inclined planes 3 and the non-projector side inclined planes 4 are located alternately along vertical direction, so that the projector side inclined planes 3 and the non-projector side inclined planes 4 form saw-toothed shapes.

The white resin layer 6 is formed on the projector side inclined plane 3 of the base material 5, and the white resin layer 6 reflects light. The white resin layer 6 reflects the light from the projector 1 to the front, i.e., toward a viewer. On the contrary, the non-projector side inclined plane 4 is a part of the base material 5 and absorbs almost of incident light. Moreover, in the explanation according to this embodiment, a "reflection" includes a "regular reflection" and a "diffuse reflection".

On the reflex-type screen 2, each of the projector side inclined planes 3 and each of the non-projector side inclined planes 4 are provided alternately along vertical direction. Specifically as shown in FIG. 2, each of the projector side inclined planes 3 is provided on lower surface of each of the saw-toothed shapes and each of the non-projector side inclined planes 4 is provided on upper surface of each of the saw-toothed shapes. Therefore, this example relates to an embodiment in which the image light is observed by providing the projector 1 at lower front of the reflex-type screen 2.

However, the location of the projector 1 is not limited to the lower front of the reflex-type screen 2. For example, in an embodiment in which the projector 1 is located at upper front of the reflex-type screen 2, the projector side inclined plane 3 faces toward upper side and the non-projector side inclined plane 4 faces toward lower side. Alternatively, when the projector 1 is located at left front of the reflex-type screen 2, the projector side inclined plane 3 is provided so that the light from the projector 1 located in the left front enters the projector side inclined plane 3 and so that the light from the projector 1 does not enter the non-projector side inclined plane 4. Similarly, when the projector 1 is located at right front of the reflex-type screen 2, the projector side inclined plane 3 is provided so that the light from the projector 1 located in the left front enters the projector side inclined plane 3 and so that the light from the projector 1 does not enter the non-projector side inclined plane 4. In these cases, each of the projector side inclined planes 3 and each of the non-projector side inclined planes 4 are provided alternately along a horizontal direction.

In addition, as described above, both the projector side inclined planes 3 and the non-projector side inclined planes 4 are provided on the surface of the reflex-type screen 2 so that the saw-toothed shapes of the base material 5 may be observed.

Although a thin film or protection material may be provided on the reflex-type screen 2, it is preferable that the saw-toothed shapes of the base material 5 appear on the surface of the reflex-type screen 2 in a similar way. Thus, it is possible to reflect the image light from the projector 1 toward the viewer more reliably, comparing to such an embodiment that a resin is deposited on the surface of the reflex-type screen 2 so that the height of the resin layer is higher than those of level differences formed on the saw-toothed shapes, and consequently the surface of the reflex-type screen 2 becomes substantially flat. Moreover, if another transparent resin is deposited on the reflex-type screen 2, it is necessary to consider a refractive index of this transparent resin, and it occurs a problem that the design of the projector side inclined plane 3 becomes complex. However, according to this embodiment, the problem mentioned above can be avoided and designing the projector side inclined plane 3 is easy.

The detail of the saw-toothed shapes configured by the projector side inclined planes 3 and the non-projector side inclined planes 4 will be described below. An angle $\alpha$ formed by one of the projector side inclined planes 3 and a reference plane 10 is determined by an angle $\beta$ formed by a normal line 12 of the reference plane 10 and the image light projected from the projector 1, where the relationship $\beta=2\alpha$ is obtained. (The angle $\beta$ is referred to as "a launch angle" hereinafter.) The launch angle $\beta$ depends on a distance L between the projector 1 and the reflex-type screen 2, and depends on a vertical location where the light image enters the screen. (The vertical location is referred to as "a height" hereinafter.)

Here, in order to reflect regularly the projected light image at the launch angle $\beta$ toward the viewer, it is necessary to make such a screen in which each of the angles a formed on the saw-toothed shapes of the screen is changed in accordance with each of the variable launch angles $\beta$.

Specifically, since each of the launch angles $\beta$ becomes gradually wider along a direction from the bottom of the reflex-type screen 2 to the top of the reflex-type screen 2, it is necessary to change each of the angles $\alpha$ formed on the saw-toothed shapes to be wider gradually in proportion to each of the launch angles $\beta$.

However, in this case, the distance L is fixed, and thereby the image light is not reflected to the viewers properly when the distance L varies, and consequently the luminance decreases, and the uniformity of the luminance distribution on the screen is lost. (The uniformity of the luminance distribution on the screen is referred to as "screen uniformity" hereinafter.) Moreover, manufacturing of such an article is quite difficult.

Here, according to this example, each of the angles a formed on the saw-toothed shapes is determined as one angle, based on the launch angle $\beta c$ at which the image light enters the center of the reflex-type screen 2. In other words, all of the saw-toothed shapes of the reflex-type screen 2 are formed at an angle $\alpha c$, at which the image light projected at the launch angle $\beta c$ is reflected to the front of the screen. Then, a white resin layer 6, of which details will be described below, is provided on the surface of the projector side inclined plane 3. Thus, such reflex-type screen 2 is realized in which the luminance uniformity seen from the front of the screen is not lost, and the bright image can be displayed even if the distance between the projector 1 and the reflex-type screen 2 varies to some extent.

In this example, for example, the projector 1 is a short focal length projector, the angle $\alpha$ (prism angle $\alpha$) formed on the saw-toothed shape is 40 degrees, the distance between the saw-teeth (prism pitch) is 300 µm, the screen size is 60 inch type (914 mm×1219 mm) and the distance L is 700.89 mm.

As shown in FIG. 2, the distance L is defined as a distance between the reflex-type screen 2 and an intersecting point of a upper side A of the image light with a bottom side B of the image light. The angel $\alpha$ may have a range so long as the luminance uniformity seen from the front is kept. Specifically, it is preferable to define the angle $\alpha$ equal to the angle $\alpha c$, which is determined on the basis of the above-mentioned angle $\beta c$, at which the image light enters the center of the reflex-type screen 2.

The angle $\alpha$ is determined depending on the contrast performance or the screen luminance required to the reflex-type screen 2. When the value of $\alpha$ is set to a large value, the area of the non-projector side inclined plane 4 increases and the area of the projector side inclined plane 3 decreases. Consequently, the contrast performance of the reflex-type screen 2 is improved and the screen luminance decreases.

On the contrary, when the value of $\alpha$ is set to a small value, the area of the non-projector side inclined plane 4 decreases and the area of the projector side inclined plane 3 increases. Consequently, the total contrast of the reflex-type screen 2 decreases, and total luminance of the screen increases. It is preferable to determine the angle $\alpha$ from 10 to 60 degrees.

Figure 3:
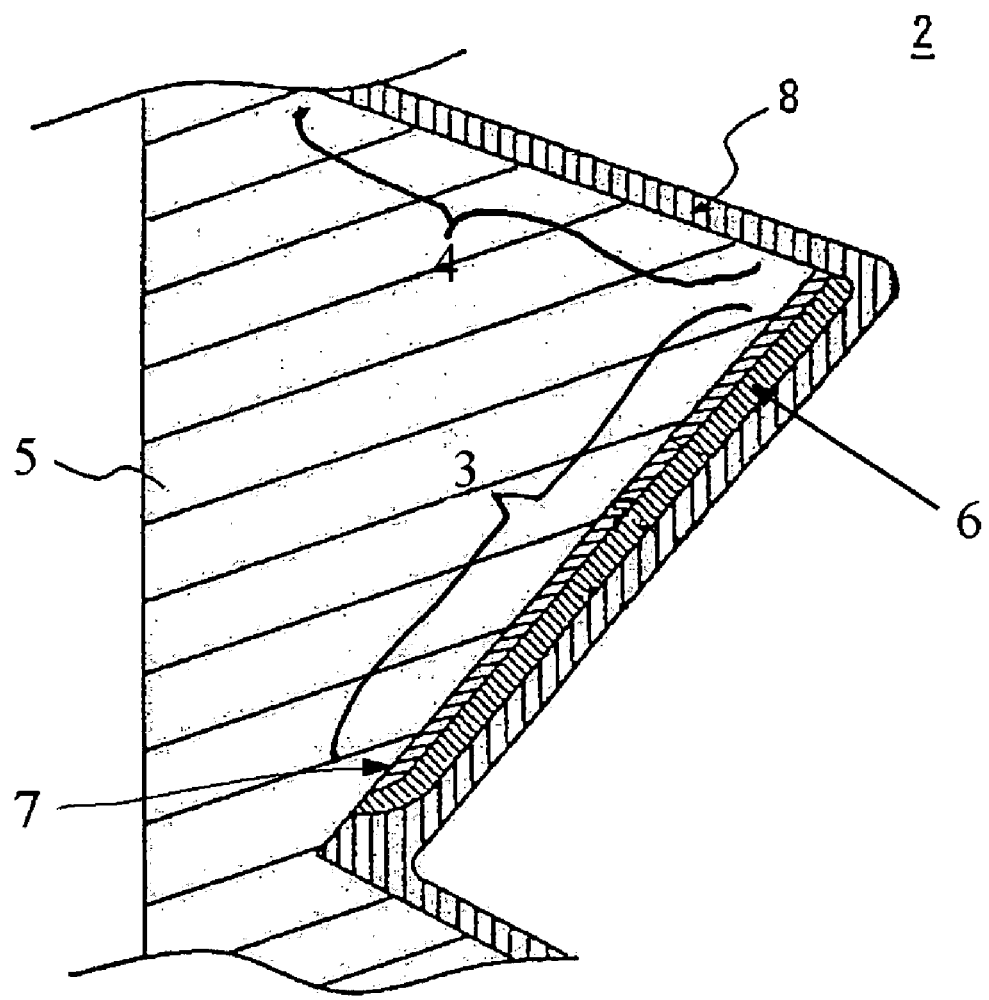
FIG. 3 is a detailed cross-section drawing showing the reflex-type screen 2.

FIG. 3 is a detailed cross-section drawing showing the reflex-type screen 2. The reflex-type screen 2 further includes a transparent diffusing layer 8, which is formed to cover the white resin layer 6. The transparent diffusing layer 8 has a transparent binder and a diffusing agent, and the transparent diffusing layer 8 diffuses light which is reflected by the white resin layer 6. Thus, the view angle of the image light from the projector 1, which is reflected by the white resin layer 6, can be magnified.

The transparent diffusing layer 8 further covers the non-projector side inclined plane 4, and diffuses light that is reflected by the non-projector side inclined plane 4. Thus, the regular reflection component of the outside light reflected by the non-projector side inclined plane 4 can be reduced, and the contrast of the image can be further increased.

The base material 5 is light absorbing material, including filler which absorbs light, and binder resin. The filler included in the base material 5 absorbs natural light, or white light. Specifically, the filler is for example, carbon black or particles of black coloring matter.

As the binder resin of the base material 5, thermoplastic resin is used. Preferably, elastic thermoplastic elastomer is used. Specifically, urethane type resin, polyolefin resin or vinyl chloride resin is used.

In this example, the base material 5 is manufactured, for example, by a process described below. At first, a resin composition of carbon back with urethane thermoplastic elastomer is prepared, where the carbon black corresponds to the filler and the urethane thermoplastic elastomer corresponds to the binder resin. Next, the resin composition is coated by an appropriate coating method such as die coating, on a surface of support material (not shown in FIG. 3), for example, which is made of polyethylene terephthalate (PET). Next, the resin composition on the support material is formed to have saw-toothed shapes in cross section by rolling a heated prism rolling die on the new composition. Next, an adhesive film with an adhesive agent is prepared, and the adhesive film is put on the support material so that the adhesive side of the adhesive film faces the bottom surface of the support material, i.e., the flat plane. Next, the film of the adhesive film is taken off, leaving the adhesive agent on the support material. Finally, an aluminum composite plate of which thickness is about 3 mm is put on the adhesive agent, which has already been put on the support material.

Moreover, a hardening agent, an antistatic agent, an antifoulant, and an ultraviolet absorber which prevents the degradation of the binder resin may be added as a addition agent besides the filler and binder resin for forming the base material 5.

In addition, the aluminum composite plate, which is put on the support material via the adhesive agent, is not essential component. If the aluminum composite plate is not put on the support material, the reflex-type screen 2 can obtain flexibility so that the reflex-type screen 2 can be rolled up. Moreover, the support material may be made of any material having flexibility such as a film, and the support material may be made of polyethylene naphthalate (PEN), or polycarbonate (PC).

The projector side inclined plane 3 is provided on an inclined plane where the projected image light enters, and the white resin layer 6 is provided on the projector side inclined plane 3. The white resin layer 6 includes filler which reflects light and binder resin.

The filler included in the white resin layer 6 reflect the projected image light. Specifically, the filler is silica, titanium oxide, mica, barium sulfate, barium chloride, or aluminum, or the like.

The binder resin for forming the white resin layer 6 is made of thermoplastic resin, UV setting resin or thermosetting resin. Specifically, the binder resin is made of urethane type resin, vinyl chloride resin, polyolefin rein, or polyester resin. It is preferable to use urethane type resin as the binder resin especially.

In this example, a resin composition which is made of silica as the filler, urethane thermoplastic resin as the binder resin, diluents (general-purpose organic solvent such as butylcellosolve, methyl ethyl ketone and toluene) in which the urethane thermoplastic resin is coated on the projector side inclined plane 3 of the base material 5 by using a reverse coating, and next, the resin composition is hearted and dried at 100 degrees Celsius for two minutes, and consequently the white resin layer 6 is formed.

Moreover, besides the filler and binder resin, the white resin layer 6 may includes a hardening agent, an antistatic agent, an antifoulant, and an ultraviolet absorber which prevents the degradation of the binder resin. In addition, the resin composition is coated by a comma coater, a gravure coater, and a wire bar coater in place of a reverse coater.

Since the white resin layer 6 described above reflects effectively on the projector side inclined plane 3 the image light which is projected from the projector 1, the contrast of the reflex-type screen 2 is improved. In addition, the surface of the white resin layer 6 may be mat or frosted. Therefore, the image light is diffused and reflected and a wide view angle can be obtained.

By the way, the white resin layer 6 does not reflect the 100 percent intensity of the light from the projector 1. The white resin layer 6 transmits a certain percent intensity of the light from the projector 1, for example, the white resin layer 6 transmits substantially 20 percent intensity of the light. In this case, when the light transmitted through the white resin layer 6 reaches the base material 5, the reached light is absorbed without reflection. According to this embodiment, as shown in FIG. 3, the reflex-type screen 2 may further include an reflection increasing layer 7 between the base material 5 and the white resin layer 6. The reflectivity of the reflection increasing layer 7 is higher than that of the base material 5, and the light blocking effect of the reflection increasing layer 7 is higher than that of the white resin layer 6. The reflection increasing layer 7 can reflect the light from the projector 1 effectively by reflecting the light which is transmitted through the white resin layer 6, and thereby the contrast of the image can be increased.

The reflection increasing layer 7 is a metal layer, which is essentially made of aluminum, for example. The reflection increasing layer 7 described below can be formed easily by vapor deposition of aluminum, aluminum sputtering and so forth.

Alternatively, the reflection increasing reflecting layer 7 may include a high reflectivity filler and binder, and the high reflectivity filler reflects light. In this case, the reflectivity of the high reflectivity filler included in the reflection increasing layer 7 is higher than that of the high reflectivity filler included in the white resin layer 6. Therefore, the high reflectivity filler can effectively reflect the light that is transmitted through the white resin layer 6, and the reflection increasing layer 7 can be formed easily as the similar way of the white resin layer 6. For example, the reflection increasing layer 7 includes high reflectivity filler, which is made of barium chloride or barium sulfate, having at most about 98% reflectivity. The white resin layer 6 includes aluminum filler, of which reflectivity is normally 70–80% and at most 85%.

Alternatively, the reflection increasing layer 7 and the white resin layer 6 includes the same kind of high reflectivity filler. In this case, the content of the high reflectivity filler of the reflection increasing layer 7 is higher than the content of the high reflectivity filler of the white resin layer 6. Therefore, materials for the reflection increasing layer 7 can be easily prepared and the reflection increasing layer 7 can be easily formed in a similar way to the white resin layer 6.

Figure 4:
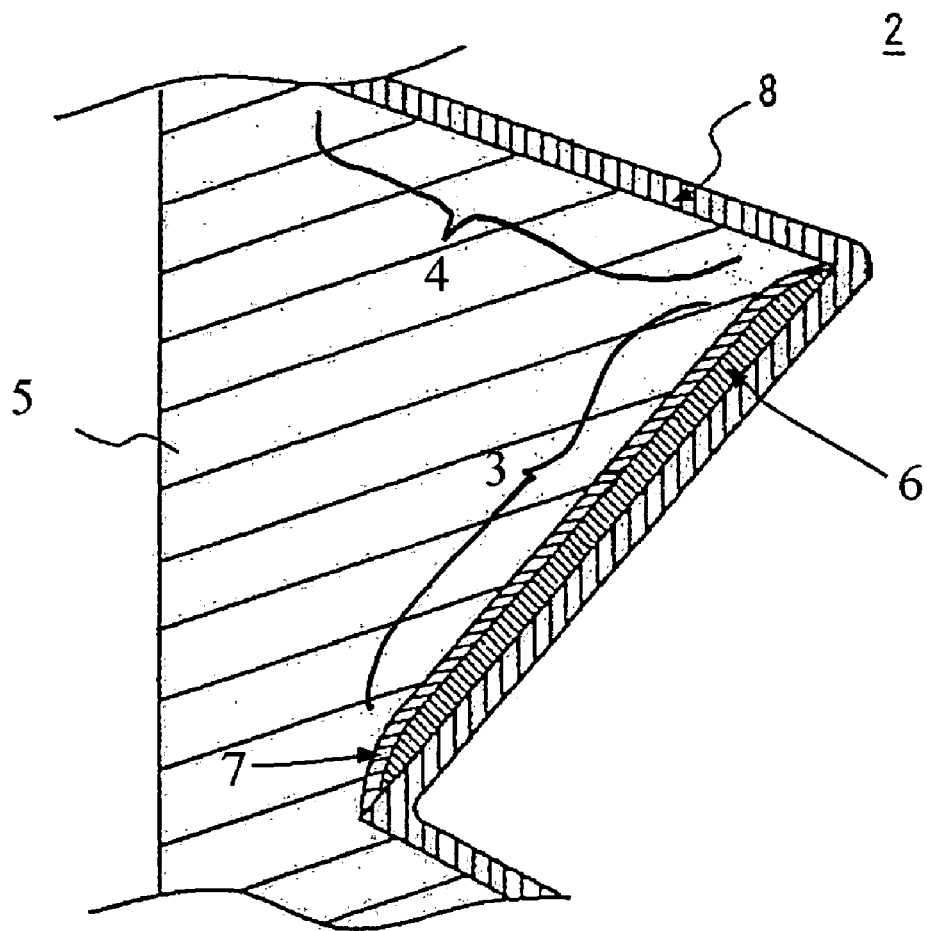
FIG. 4 is a cross-section drawing showing another example of a projector side inclined plane 3 and a white resin layer 6.

FIG. 4 is a cross-section drawing showing another example of the projector side inclined plane 3 and the white resin layer 6. In this example, a hollow which corresponds to an extent of the white resin layer 6 is formed on the white resin layer 6. The surface of the white resin layer 6 is formed to be flat on the hollow. The flat surface of the white resin layer 6 reflects the light of the projector 1. In this case, the flatness of the white resin layer 6 is improved because of the hollow of the projector side inclined plane 3. More preferably, the hollow for forming the white resin layer 6 is formed so that the hollow becomes gradually deeper along a direction from an outside edge of the extent of the white resin layer 6 to an inside of the extent of the white resin layer 6. Therefore, the liquid white resin with high viscosity can be avoided from being raised at an edge part of the white resin layer 6 by surface tension in the coating process of the white resin layer 6, and the finishing flatness can be increased. Thereby, the reflex-type screen 2 can display image having a high peak gain.

As described above, the non-projector side inclined plane 4 is provided so that the light absorbing materials are visible. Therefore, it is possible to increase the contrast of the reflex-type screen 2 without further providing another light absorbing part, such as a light absorbing layer.

Moreover, the surface of the non-projector side inclined plane 4 may be formed to be mat or frosted, and in this case, the contrast of the screen is increased because the reflection of the outside light, which enters the screen plane, is reduced (by the diffusion). In addition, the transparent diffusing layer 8 diffuses the light reflected by the non-projector side inclined plane 4 by covering the non-projector side inclined plane 4. Therefore, the regular reflection component of the outside light reflected by the non-projector side inclined plane 4 can be reduced, and the contrast of the image can be further increased.

Since this example is configured as described above, when the image light is projected obliquely at a short distance from the reflex-type screen 2 by the projector 1 and when the image is observed in front of the screen, the image light is reflected by the projector side inclined plane 3 on which the white resin layer 6 is provided, to the viewer who is just in front of the reflex-type screen 2, so that the image light reflection of to the exterior of the viewer's location is avoided. Therefore, a fine image light can be observed, of which the luminance distribution is uniform and of which the brightness has no irregularity.

In other words, according to this example, it is possible to realize an extremely practicable reflex-type screen having both a high contrast performance and a sufficient view angle performance, of which luminance distribution on the screen can be increased, and which is further easily manufactured as a big size screen.

What is claimed is:

1. A reflex-type screen for reflecting a light projected obliquely from a projector to a front of the reflex-type screen, comprising:
    a base material made of material which absorbs light, comprising:
        a projector side inclined plane that is provided at an angle so that light from said projection enters said projector side inclined plane; and
        a non-projector side inclined plane that is provided at an angle so that the light from said projection does not enter said non-projector side inclined plane, wherein said projector side inclined plane and said non-projector side inclined plane are located alternatively, so that said base material is formed to be saw-toothed shape;
    a white resin layer which is formed on said projector side inclined plane on said base material and reflects light; and
    a transparent diffusing layer which comprises transparent binder resin and diffusing agent, and is formed to cover said white resin layer; wherein
    said white resin layer reflects the light from said projector to the front of the reflex-type screen, and said non-projector side inclined plane absorbs almost of incident light, and said transparent diffusing layer diffuses light which is reflected by said white resin layer.

2. The reflex-type screen in claim 1, wherein said white resin layer provided on said projector side inclined plane comprises reflecting filler which reflects light and binder resin.

3. The reflex-type screen in claim 2, wherein said white resin layer is treated with surface roughing thereon.

4. The reflex-type screen in claim 2, wherein said non-projector side inclined plane is treated with surface roughing thereon.

5. The reflex-type screen in claim 2, wherein said base material comprises filler which absorbs light.

6. The reflex-type screen in claim 1, wherein said white resin layer is treated with surface roughing thereon.

7. The reflex-type screen in claim 6, wherein said non-projector side inclined plane is treated with surface roughing thereon.

8. The reflex-type screen in claim 6, wherein said base material comprises filler which absorbs light.

9. The reflex-type screen in claim 1, wherein said non-projector side inclined plane is treated with surface roughing thereon.

10. The reflex-type screen in claim 9, wherein said base material comprises filler which absorbs light.

11. The reflex-type screen in claim 1, wherein said base material comprises filler which absorbs light.

12. The reflex-type screen in claim 1, wherein said transparent diffusing layer further covers said non-projector side inclined plane and diffuses light which is reflected by said non-projector side inclined plane.

13. The reflex-type screen in claim 1 further comprising an reflection increasing layer, of which reflectivity is higher than the reflectivity of said base material, and of which light blocking effect is higher than the light blocking effect of said white resin layer, and which is formed between said base material and said white resin layer.

14. The reflex-type screen in claim 13, wherein said reflection increasing layer is a metal layer, essentially made of aluminum.

15. The reflex-type screen in claim 13, wherein
    both said white resin layer and said reflection increasing layer comprise filler which reflects light and binder, and
    a reflectivity of the filler included in said reflection increasing layer is higher than the reflectivity of the filler included in said white resin layer.

16. The reflex-type screen in claim 13, wherein
    both said white resin layer and said reflection increasing layer comprise filler which reflects light and binder, and
    a content of said filler included in said reflection increasing layer is higher than the content of the filler included in said white resin layer.

17. A reflex-type screen for reflecting a light projected obliquely from a projector to a front of the reflex-type screen, comprising:
    a base material made of material which absorbs light, comprising:
        a projector side inclined plane that is provided at an angle so that light from said projection enters said projector side inclined plane; and
        a non-projector side inclined plane that is provided at an angle so that the light from said projection does not enter said non-projector side inclined plane, wherein said projector side inclined plane and said non-projector side inclined plane are located alternatively, so that said base material is formed to be saw-toothed shape; and
    a white resin layer which is formed on said projector side inclined plane on said base material and reflects light; wherein
    said projector side inclined plane forms a hollow that corresponds to an extent of said white resin layer, and a surface of said white resin layer is formed to be flat on said hollow and said flat surface of said white resin layer reflects the light from said projector to the front of the reflex-type screen, and said non-projector side inclined plane absorbs almost of incident light.

18. The reflex-type screen in claim 17, wherein said hollow in which said white resin layer is formed becomes deep gradually along a direction from an outside edge of the extent of said white resin layer to an inside of the extent of said white resin layer.

19. The reflex-type screen in claim 18, wherein said white resin layer is treated with surface roughing thereon.

20. The reflex-type screen in claim 18, wherein said non-projector side inclined plane is treated with surface roughing thereon.

21. The reflex-type screen in claim 18, wherein said base material comprises filler which absorbs light.

22. The reflex-type screen in claim 17, wherein said white resin layer is treated with surface roughing thereon.

23. The reflex-type screen in claim 17, wherein said non-projector side inclined plane is treated with surface roughing thereon.

24. The reflex-type screen in claim 17, wherein said base material comprises filler which absorbs light.

25. The reflex-type screen in claim 17 further comprising an reflection increasing layer, of which reflectivity is higher than the reflectivity of said base material, and of which light blocking effect is higher than the light blocking effect of said white resin layer, and which is formed between said base material and said white resin layer.

\* \* \* \* \*